United States Patent
Nishimura et al.

(10) Patent No.: US 10,884,962 B2
(45) Date of Patent: Jan. 5, 2021

(54) CONTROL DEVICE, AND SLAVE DEVICE CONTROL METHOD

(71) Applicant: OMRON Corporation, Kyoto (JP)

(72) Inventors: Maki Nishimura, Ritto (JP); Megumu Asano, Moriyama (JP)

(73) Assignee: OMRON CORPORATION, Kyoto (JP)

(*) Notice: Subject to any disclaimer, the term of this patent is extended or adjusted under 35 U.S.C. 154(b) by 0 days.

(21) Appl. No.: 16/643,605

(22) PCT Filed: Sep. 20, 2018

(86) PCT No.: PCT/JP2018/034907
§ 371 (c)(1),
(2) Date: Mar. 2, 2020

(87) PCT Pub. No.: WO2019/073779
PCT Pub. Date: Apr. 18, 2019

(65) Prior Publication Data
US 2020/0210362 A1     Jul. 2, 2020

(30) Foreign Application Priority Data

Oct. 13, 2017 (JP) ................. 2017-199354

(51) Int. Cl.
*G06F 13/36* (2006.01)
*G06F 13/362* (2006.01)
*G06F 11/07* (2006.01)

(52) U.S. Cl.
CPC ........ *G06F 13/362* (2013.01); *G06F 11/0721* (2013.01); *G06F 11/0793* (2013.01)

(58) Field of Classification Search
CPC . G06F 13/362; G06F 11/0721; G06F 11/0793
See application file for complete search history.

(56) References Cited

U.S. PATENT DOCUMENTS

2015/0012140 A1* 1/2015 Fang ................. G05B 19/0421
700/275
2018/0203438 A1* 7/2018 Henze ................ G05B 19/4184

FOREIGN PATENT DOCUMENTS

| JP | S63-224446 A | 9/1988 |
| JP | H07-231489 A | 8/1995 |
| JP | 2011-258003 A | 12/2011 |
| JP | 2015-232761 A | 12/2015 |

(Continued)

OTHER PUBLICATIONS

Translation of JP-2015232761 (Year: 2015).*

(Continued)

*Primary Examiner* — Henry Tsai
*Assistant Examiner* — John B Roche
(74) *Attorney, Agent, or Firm* — METROLEX IP LAW GROUP, PLLC (57) ABSTRACT

A main control section (30) of a slave device (3) include a slave controller (31), a processor (32), and a watchdog circuit (33) which are configured as a one-chip integrated circuit. In a case where the watchdog circuit (33) has detected that a malfunction has occurred in an operation of the main control section (30), the watchdog circuit (33) resets the processor (32) while not stopping an operation of the slave controller (31).

5 Claims, 5 Drawing Sheets (56) References Cited

FOREIGN PATENT DOCUMENTS

JP         2015232761 A   *  12/2015

OTHER PUBLICATIONS

An English translation of the International Search Report ("ISR") of PCT/JP2018/034907 dated Nov. 20, 2018.
The Written Opinion of the International Searching Authority ("WO") of PCT/JP2018/034907 dated Nov. 20, 2018.
The International Preliminary Report on Patentability ("IPEA/409") of PCT/JP2018/034907 dated Oct. 15, 2019.

* cited by examiner

CONTROL DEVICE, AND SLAVE DEVICE CONTROL METHOD

TECHNICAL FIELD

The present disclosure relates to, for example, a control device configured to control an operation of a slave device which is connected to a master device via a field network.

BACKGROUND ART

Conventionally, microcontrollers are provided on various electronic devices. A microcontroller includes, for example, a central processing unit (CPU), a memory, and peripheral devices. Microcontrollers have been increasingly made into a one-chip type, so that each microcontroller is provided as a single (one-chip) large-scale integrated circuit (LSI) on which the CPU and the like are provided.

In general, a microcontroller includes a watchdog timer. The watchdog timer monitors whether or not the microcontroller is operating normally. In a case where a watchdog timeout occurs because, for example, the microcontroller goes out of control, the watchdog timer resets the operation of the microcontroller. This prevents the microcontroller from going out of control (see, for example, Patent Literature 1).

CITATION LIST

Patent Literature

[Patent Literature 1]
Japanese Patent Application Publication Tokukaihei No. 7-231489 (Publication date: Aug. 29, 1995)

SUMMARY OF INVENTION

Technical Problem

Meanwhile, machines and equipment used at a production site, such as a factory, are controlled by a control system including a high-level control device (also called "master device") such as a programmable logic controller (PLC). The machines and equipment, which are communicably connected to the master device, may be also called "slave devices". The master device and the slave devices may be connected via various field networks. The slave devices each include (i) a microcontroller for controlling the slave device and (ii) a communication controller for sending and receiving information via the field network.

In a case where the slave device includes the microcontroller and the communication controller as individual chips, the following is true. That is, in a case where a watchdog timeout occurs, an operation of the microcontroller is reset, whereas the communication controller is not reset. In this case, communication carried out via the field network is continued.

Meanwhile, in recent years, there are cases where a slave device is a device including a one-chip microcontroller in which a communication controller is embedded into a microcontroller. This configuration is employed to meet demands such as high-speed operation and a reduction in component size.

According to a slave device including such a one-chip microcontroller, however, a reset circuit is shared by the CPU in the microcontroller and by the communication controller. Therefore, in a case where a watchdog timeout occurs, the operation of the CPU is reset, and the operation of the communication controller is also stopped. This unfortunately interrupts the communication carried out via the field network.

An aspect of the present disclosure has been made in view of the problem, and an object of the present disclosure is achieve the following control in a slave device including a one-chip microcontroller (control device) in which a communication controller for a field network is embedded: Specifically, communication carried out via the field network can be continued in a case where a malfunction occurs in an operation of the control device.

Solution to Problem

A control device in accordance with an aspect of the present invention is a control device provided in a slave device so as to control an operation of the slave device, which slave device is configured to be connected to a master device via a field network, the control device including: a slave communication controller configured to control communication carried out via the field network; a processing section configured to carry out arithmetic processing; and an operation monitoring section configured to monitor an operation of the control device, the slave communication controller, the processing section, and the operation monitoring section being configured as a one-chip integrated circuit, and the control device being configured so that in a case where the operation monitoring section has detected that a malfunction has occurred in the operation of the control device, the operation monitoring section resets the processing section while not stopping an operation of the slave communication controller.

Advantageous Effects of Invention

With an aspect of the present disclosure, a slave device including a one-chip microcontroller (control device) in which a communication controller for a field network is embedded can advantageously achieve control so as to allow communication via the field network to be continued in a case where a malfunction occurs in an operation of the control device.

DESCRIPTION OF EMBODIMENTS

The following description will discuss an embodiment in accordance with an aspect of the present disclosure (also referred to as "present embodiment") with reference to the drawings.

§ 1. COMPARATIVE EXAMPLE

Figure 4:
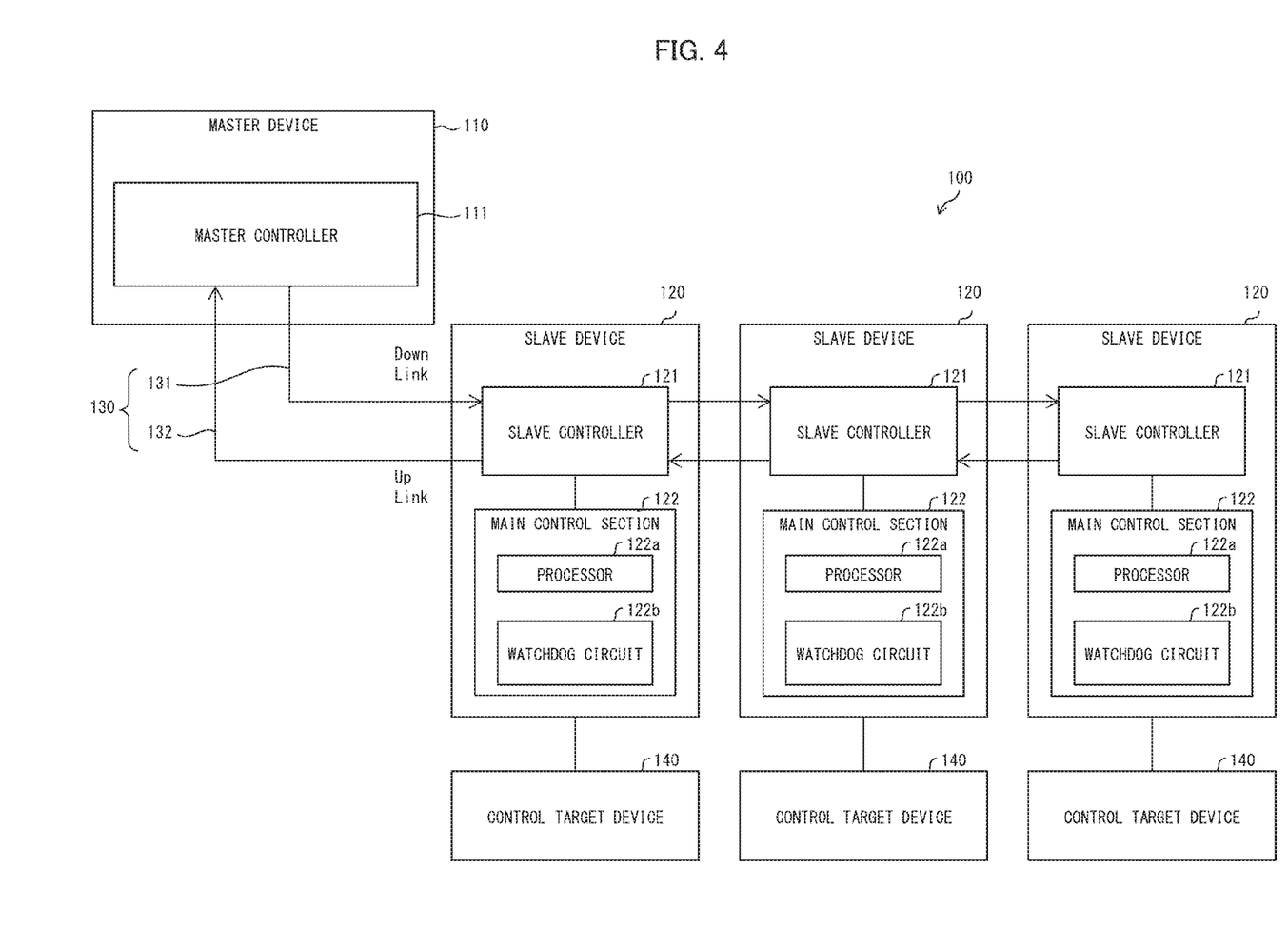
FIG. 4 is a block diagram schematically illustrating a configuration of a control system in accordance with Comparative Example.
Figure 5:
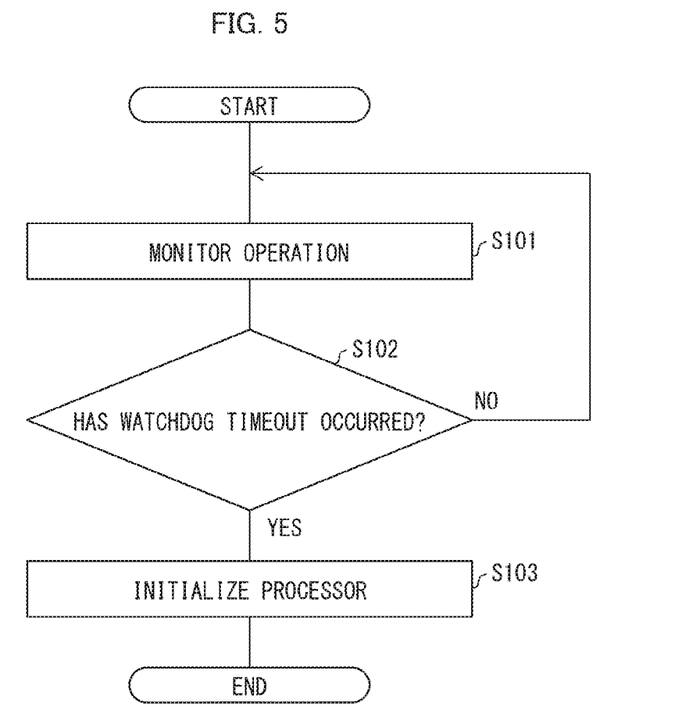
FIG. 5 is a flowchart illustrating a flow of an operation monitoring process carried out by a slave device included in the control system in accordance with Comparative Example.

For easy understanding of a control system and a control device in accordance with the embodiment, a control system in accordance with Comparative Example will be first described with reference to FIGS. 4 and 5. The control system in accordance with Comparative Example includes a slave device in which a microcontroller and a communication controller are provided as individual chips. FIG. 4 is a block diagram schematically illustrating a configuration of a control system 100 in accordance with Comparative Example. FIG. 5 is a flowchart illustrating a flow of an operation monitoring process carried out by a slave device 120 included in the control system 100 of Comparative Example.

As illustrated in FIG. 4, the control system 100 in accordance with Comparative Example includes: a master device 110; slave devices 120 connected to the master device 110; and control target devices 140. To the master device 110, the three slave devices 120, which are arranged in series, are connected. Such a network form (topology) is also called "daisy-chain connection". The slave devices 120 are communicably connected to the master device 110 via a field network 130 (a downlink 131 and an uplink 132). Based on data communication with the master device 110, the slave devices 120 control the corresponding control target devices 140.

The master device 110 includes a master controller 111 configured to manage the field network 130. The slave devices 120 each include a slave controller 121 and a main control section 122. The main control section 122 is, for example, a microcontroller which includes a processor 122a and a watchdog circuit 122b.

In each of the slave devices 120, the slave controller 121 and the main control section 122 are provided as individual chips. Such a slave controller 121 is, for example, intended for an application specific integrated circuit (ASIC).

An operation of the watchdog circuit 122b in each of the slave devices 120 in accordance with Comparative Example will be described below with reference to FIG. 5.

As illustrated in FIG. 5, the watchdog circuit 122b monitors an operation of the main control section 122 (Step 101 (hereinafter abbreviated, such as "S101")). In a case where no watchdog timeout occurs (NO in S102), an operation of S101 is repeated. In a case where the processor 122a goes out of control so as to cause the occurrence of a watchdog timeout (YES in S102), the watchdog circuit 122b resets (initializes) the operation of the processor 122a (S103). It should be noted that the slave controller 121 includes a processor (not illustrated) therein. In the case where the watchdog timeout occurs, the processor is not reset.

According to the configuration of the control system 100 of Comparative Example, the slave controllers 121 do not stop operating in a case where a watchdog timeout has occurred. This allows communication via the field network 130 to be continued.

However, in recent years, there are cases where a slave controller is embedded in a microcontroller which is provided in a slave device. In such a case, the occurrence of a watchdog timeout causes an operation of the slave controller to stop. This unfortunately interrupts the communication via the field network.

§ 2. APPLICATION EXAMPLE

Figure 1:
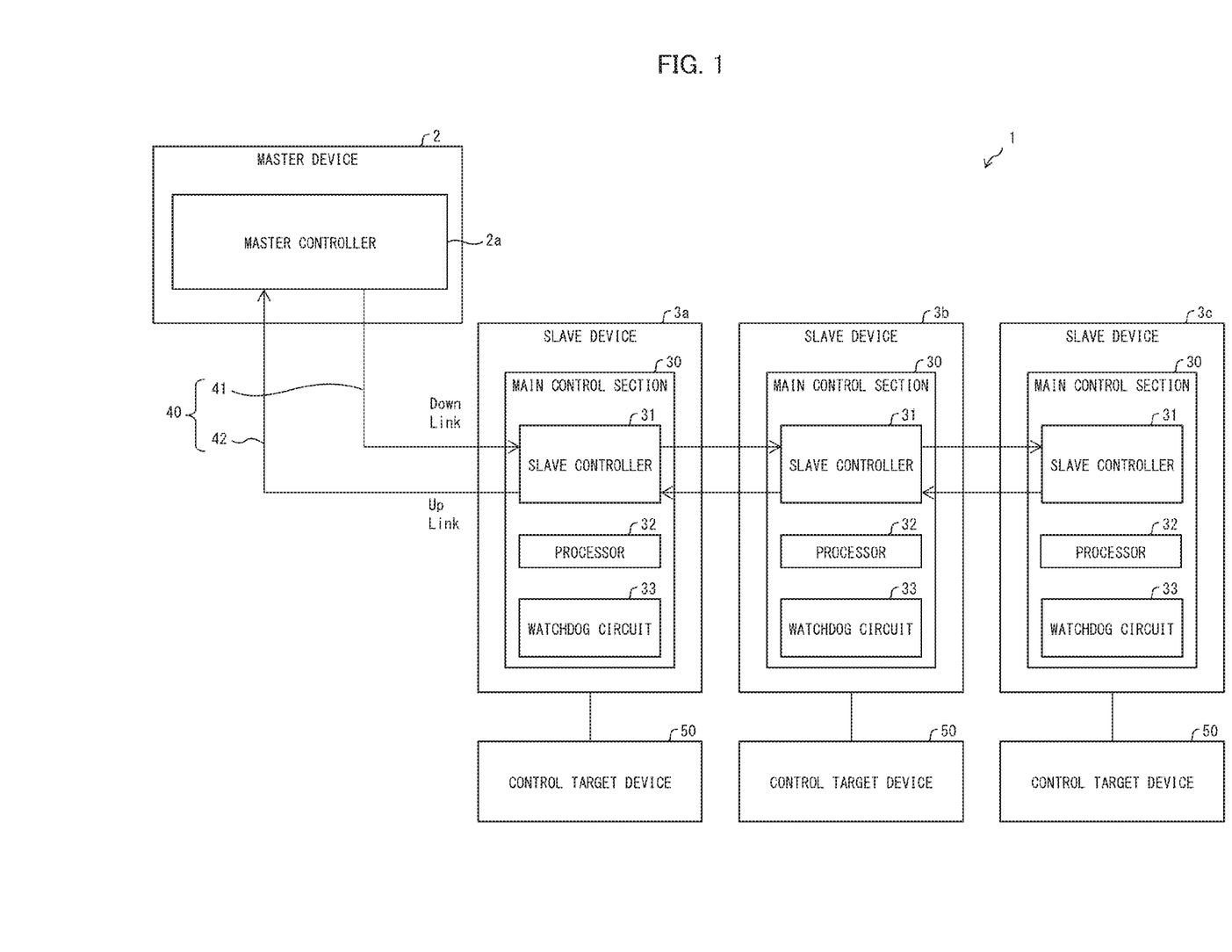
FIG. 1 is a block diagram schematically illustrating a control system including: slave devices each including a main control section serving as a control device in an embodiment; and a master device.

An example in which the present disclosure is applied will be described next with reference to FIG. 1. FIG. 1 is a block diagram schematically illustrating a control system 1 including: slave devices 3a through 3c each including a main control section 30 serving as a control device in the present embodiment; and a master device 2. To each of the slave devices 3a through 3c, a control target device 50 is communicably connected. The control system 1 of the present embodiment is configured so that the slave devices 3a through 3c control the corresponding control target devices 50 in accordance with a command transmitted from the master device 2 via a field network 40. The field network is also referred to as "field bus system". Hereinafter, the slave devices 3a through 3c will also be collectively referred to as "slave devices 3" when no distinction is to be made.

In the example shown in FIG. 1, the control system 1 includes: the master device 2; the three slave devices 3a through 3c which are communicably connected to the master device 2 via the field network 40; and the control target devices 50. The slave devices 3a through 3c control the corresponding control target devices 50 based on data communication with the master device 2.

The master device 2 is, for example, a PLC. To the master device 2, a support device (not illustrated) such as a personal computer (PC) is connected via a connection cable. The master device 2 includes a master controller 2a which manages data transmission to/from the slave devices 3a through 3c via the field network 40. Examples of the master controller 2a encompass a microcontroller and ASIC.

The field network 40 in the control system 1 of the present embodiment is Ethernet for Control Automation Technology (EtherCAT) (registered trademark). EtherCAT is a communication system based on Ethernet (registered trademark), and has been widely used in recent years. According to EtherCAT, a master device periodically transmits Ethernet protocols (Ethernet frames) in accordance with IEEE802.3 via Ethernet (transmission line), and, by an on-the-fly method, slave devices handle process data carried on the Ethernet frames.

A topology of the field network 40 in the control system 1 of the present embodiment is a daisy-chain type. Specifically, the three slave devices 3a through 3c are arranged in series to be connected to the master device 2 via the field network 40.

Because the data transmission on EtherCAT is known, a detailed explanation will be omitted to avoid redundancy. A brief description is as follows. In a case where the slave device 3a has received an Ethernet frame which is periodically transmitted from the master device 2, the slave device 3a reads and writes data from/to a region of process data on the Ethernet frame, which region is allocated to the slave device 3a. While the slave device 3a reads and writes the data, the slave device 3a forwards the Ethernet frame to the slave device 3b which is a next slave device.

The field network 40 includes a downlink 41 and an uplink 42. An Ethernet frame is transmitted from the master device 2 to the slave device 3a, to the slave device 3b, and to the slave device 3c in this order via the downlink 41. Then, the Ethernet frame is transmitted from the slave device 3c to the slave device 3b, to the slave device 3a, to the master device 2 in this order via the uplink 42.

The slave devices 3a through 3c each include a main control section 30. The main control section 30 includes a slave controller (slave communication controller) 31, a processor (processing section) 32, and a watchdog circuit (operation monitoring section) 33. The slave controller 31 controls communication carried out via the field network 40. The processor 32 is, for example, a CPU. The processor 32 sends and receives data to/from the slave controller 31 so as to carry out arithmetic processing for the control carried out by the main control section 30. The watchdog circuit 33 is an operation monitoring section for monitoring whether or not the main control section 30 is operating normally.

Because a method by which the watchdog circuit 33 monitors the operation of the main control section 30 is generally known, a detailed explanation will be omitted to avoid redundancy. A brief description is as follows. For example, before a counter of the watchdog timer times out, the counter is reset by a program. This operation of resetting the counter is carried out periodically as part of a program to be executed by the processor 32. Hereinafter, a resetting operation to reset the counter will be referred to as "refreshing" to be distinguished from an operation to reset the processor 32. In a case where the processor 32 goes out of control, the processor 32 no longer refreshes, so that an overflow of a timer occurs. In such a case, the watchdog circuit 33 resets the processor 32. Note that the counting of the timer can be countdown from a certain initial value.

The main control section 30 is, for example, a microcontroller, and is configured as a one-chip integrated circuit. The main control section 30 includes a memory and various peripheral functional parts (not illustrated).

The control target devices 50 connected to the corresponding ones of the slave devices 3a through 3c are, for example, servomotors. A variety of devices can be applied to the control target devices 50, provided that the devices meet the standards of the field network 40.

The main control section 30 included in each of the slave devices 3a through 3c is thus configured so that the slave controller 31, the processor 32, and the watchdog circuit 33 are provided on a single chip (i.e., is a one-chip device). Note the main control section 30, of course, includes circuits having other functions.

Such a configuration conventionally poses the following problem (which will be explained with use of the reference signs shown in FIG. 1): Conventionally, in a case where a watchdog timeout occurs, the watchdog circuit 33 resets the processor 32 and the slave controller 31. This unfortunately disrupts communication between the master device 2 and the slave devices 3a through 3c via the field network 40. An effect of such disruption is significant in a case where the slave devices 3a through 3c are of a daisy-chain type topology. In a case of, for example, data transmission on EtherCAT, the entire field network 40 is forced to stop if a slave controller 31 of any of the slave devices 3a through 3c stops.

In contrast, according to the control system 1 of the present embodiment, in a case where a watchdog timeout occurs, the watchdog circuit 33 resets the processor 32, but does not stop the operation of the slave controller 31. In addition, in a case where a watchdog timeout occurs, the watchdog circuit 33 transmits an error output signal (also referred to as "ERROROUT signal") which stops only part of the functions of the slave device 3. Therefore, in a case where a watchdog timeout occurs, communication by the slave controller 31 can be continued. This makes it easy to inform the master device 2 which of the slave devices 3 has encountered a malfunction. Then, a user easily can recover the control system 1 by referring to such information. In particular, in a case where the slave devices 3 are of daisy chain (series) topology (sequence), it is possible to continue communicating with the other slaves. This prevents the entire field network 40 from being forced to stop.

In addition, while an error output signal transmitted by the watchdog circuit 33 is used to block an output of, for example, the slave device 3, the watchdog circuit 33 carries out control so that an input from the outside into the slave device 3 is not blocked. This increases the degree of freedom in during-error operation carried out by the slave device 3 in a case where a watchdog timeout occurs.

§ 3. CONFIGURATION EXAMPLE

[Hardware Configuration]

Figure 2:
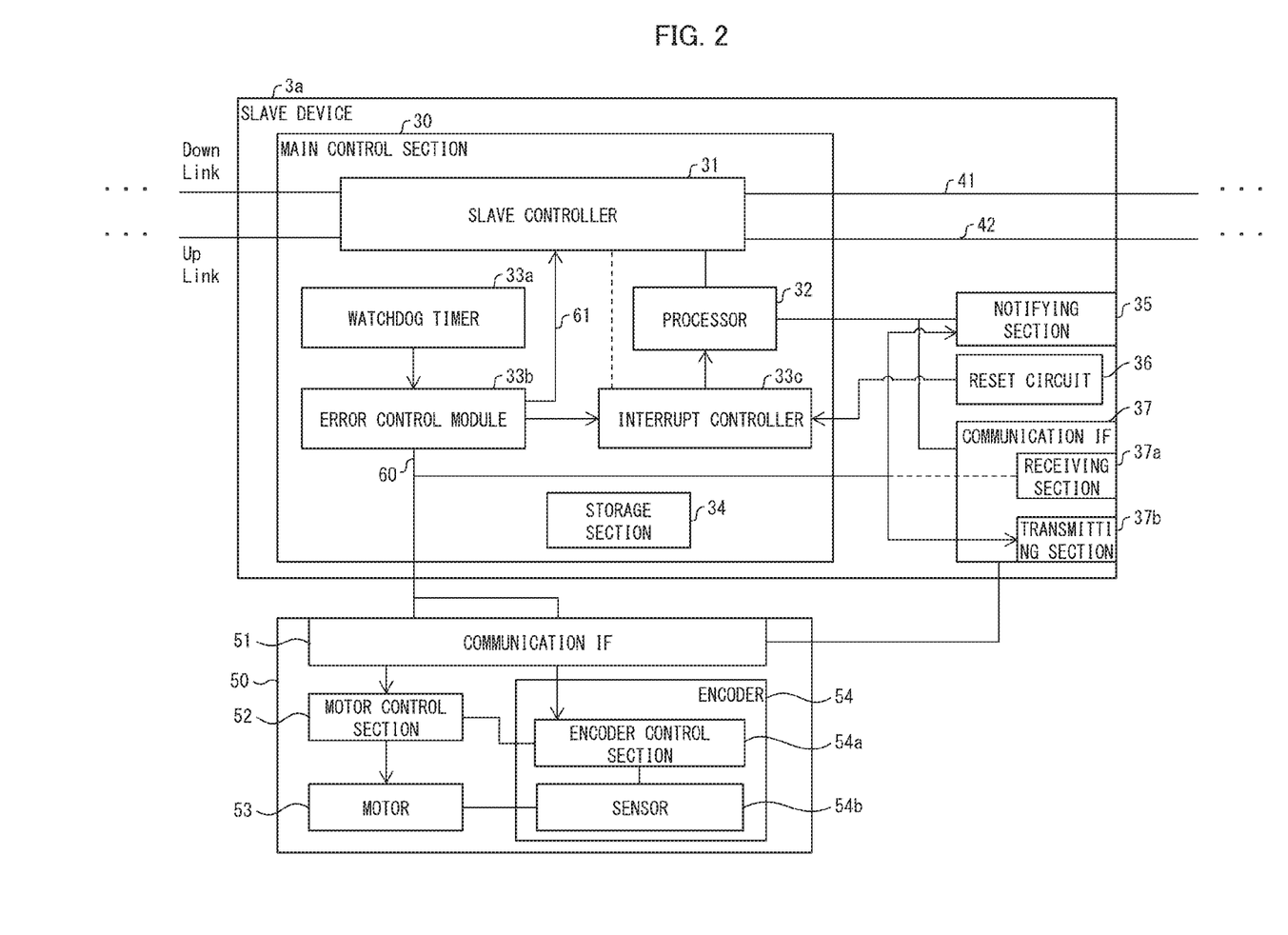
FIG. 2 is a block diagram illustrating a configuration of main parts of (i) a slave device including a main control section serving as a control device in the embodiment and (ii) a control target device connected to the slave device.

An example of a hardware configuration of main parts of the control system 1 of the present embodiment will be described next with reference to FIG. 2. Specifically, the slave device 3a out of the slave devices 3a through 3c will be described as an example. The configuration of the main parts of the slave device 3a and the corresponding control target device 50 will be described below. FIG. 2 is a block diagram illustrating the configuration of the main parts of (i) the slave device 3a including the main control section 30 serving as a control device in the present embodiment and (ii) the control target device 50 connected to the slave device 3a. Note that in FIG. 2, each arrow indicates a flow in which a signal is transmitted during a watchdog timeout. The flow will be described later.

(Slave Device)

In the example shown in FIG. 2, the slave device 3a includes the main control section 30, a notifying section 35, a reset circuit (external reset circuit) 36, and a communication interface 37. The main control section 30 of the present embodiment corresponds to "control device" of the present disclosure. In FIG. 2, the communication interface is indicated as "communication IF".

The main control section 30 includes the slave controller 31, the processor 32, a watchdog timer 33a, an error control module 33b, an interrupt controller 33c, and a storage section 34. The watchdog timer 33a, the error control module 33b, and the interrupt controller 33c correspond to the watchdog circuit 33 described earlier.

The watchdog timer 33a is, for example, a stand-alone watchdog timer which is generally known. The watchdog timer 33a includes, for example, a 14-bit down counter. In a case where a count value reaches a value of an underflow, the watchdog timer 33a transmits, to the error control module 33b, an error notification (hereinafter referred to as "malfunction occurrence signal") which indicates that a malfunction has occurred in the operation of the main control section 30. Note that the watchdog timer 33a can include an up counter. In such a case, the watchdog timer 33a transmits a malfunction occurrence signal in a case where the count value reaches a value of an overflow. Examples of the counter encompass an RC oscillator circuit.

In a case where the error control module 33b receives the malfunction occurrence signal from the watchdog timer 33a, i.e., in a case where the malfunction has occurred in the operation of the main control section 30, the error control module 33b carries out, independently of the processor 32, control of a during-malfunction operation of the main control section 30. In other words, the error control module 33b is a during-malfunction operation control section for carrying out an operation such as generating an interrupt signal and/or transmitting an error output signal. The error control module 33b is achieved as an electronic circuit in the main control section 30 serving as a one-chip integrated circuit.

In response to a command from the error control module 33b, the interrupt controller 33c forcibly interrupts (i.e., non-maskable interruption) the processor 32.

The storage section 34 is, for example, a memory including a random access memory (RAM) and a read only memory (ROM). ROM stores, for example, a program executed by the processor 32. RAM is used as a working area. The storage section 34 also stores register values for setting the respective operations of the parts of the main control section 30.

The following will be described later in detail: (i) the processes carried out by the error control module 33b and the interrupt controller 33c during a watchdog timeout and (ii) the register values stored in the storage section 34.

Examples of the notifying section 35 encompass a light emitting diode (LED), a speaker, and a display. The notifying section 35 provides various information to the outside of the slave device 3a. For example, during a watchdog timeout, the notifying section 35 provides malfunction information which indicates that the slave device 3a is encountering a malfunction. The notifying section 35 provides information by, for example, turning on the LED. A specific way by which the notifying section 35 provides malfunction information is not limited to any particular one.

The reset circuit 36 is a circuit generally included in various electrical apparatuses so as to reset the operations of the apparatuses in accordance with external reset signals. When a power supply of the slave device 3a is turned on, the reset circuit 36 transmits, to the interrupt controller 33c, a command for resetting the operation of the main control section 30.

The communication interface 37 includes a receiving section 37a and a transmitting section (output section) 37b. The communication interface 37 is communicably connected to the control target device 50 to send and receive data. According to the slave device 3a of the present embodiment, during a watchdog timeout, the operation of the receiving section 37a continues, whereas output from the transmitting section 37b stops. This configuration will be described later.

(Control Target Device)

In the example shown in FIG. 2, the control target device 50 includes a communication interface 51, a motor control section 52, a motor 53, and an encoder 54.

The communication interface 51 receives a control signal transmitted from the slave device 3a, and then transmits the control signal to the motor control section 52. The motor control section 52 is, for example, a microcontroller. The motor control section 52 controls the operation of the motor 53.

The encoder 54 includes an encoder control section 54a and a sensor 54b. The encoder control section 54a is, for example, a microcontroller. The encoder control section 54a detects the rotation of the motor 53 with use of the sensor 54b. Then, the encoder control section 54a transmits, to the motor control section 52, information indicating the detection.

(Other Remarks)

A specific hardware configuration of the slave device 3a can be changed according to an embodiment. Specifically, any of omission, replacement, and addition of a component(s) is possible as appropriate. A specific configuration of the control system 1, in which the slave device 3a is included, can also be designed as appropriate according to an embodiment.

§ 4. OPERATION EXAMPLE

[Control Device]

Figure 3:
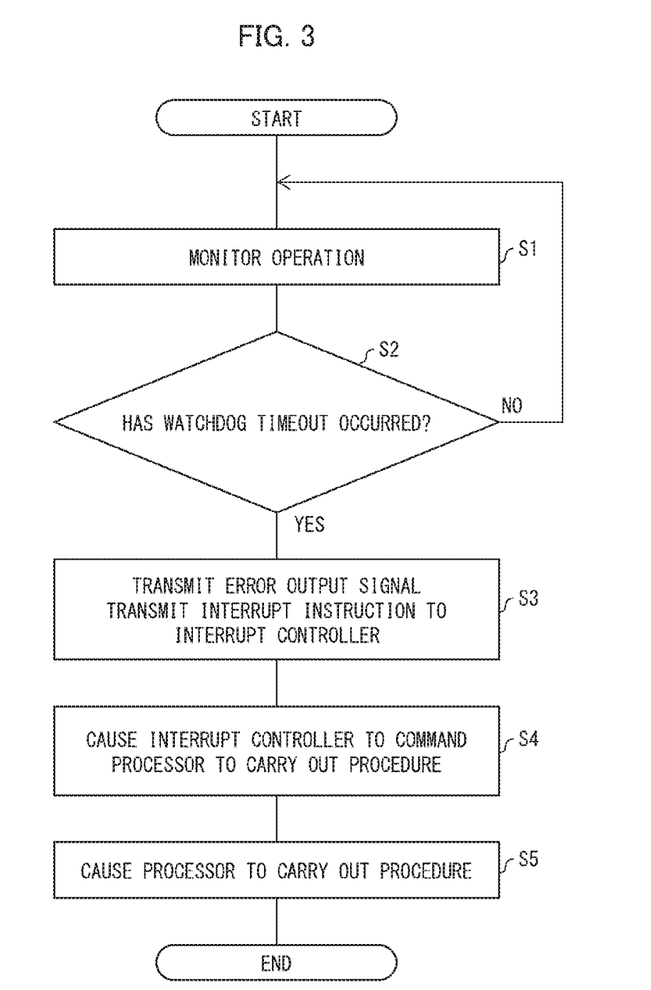
FIG. 3 is a flowchart illustrating a flow of a process carried out by the main control section serving as a control device in the embodiment.

An example, in which the slave device 3a including the main control section 30 as a control device of the present embodiment operates during a watchdog timeout, will be described next with reference to FIGS. 2 and 3. FIG. 3 is a flowchart illustrating a flow of a process carried out by the main control section 30 serving as a control device in the present embodiment. Note that a procedure described below is merely an example, and each step can be changed as much as possible. Note also that the procedure described below can be changed according to an embodiment. Specifically, any of omission, replacement, and addition of a step(s) is possible as appropriate.

(Activation)

A user first activates the control system 1, so that the master device 2 and the slave devices 3a through 3c are activated. Process data carried on an Ethernet frame is transmitted from the master device 2 to the slave device 3a via the field network 40. In the slave device 3a, the counter of the watchdog timer 33a is activated, so that the watchdog circuit 33 monitors the operation of the main control section 30 (S1).

(Monitoring of Operation Malfunction)

In a case where no watchdog timeout occurs (NO in S2), the slave device 3a repeats the process in S1. In a case where a watchdog timeout occurs (YES in S2), the watchdog timer 33a transmits a malfunction occurrence signal to the error control module 33b.

(Procedure 1 in Case of Operation Malfunction)

In a case where the error control module 33b has received the malfunction occurrence signal, the error control module 33b transmits an interrupt instruction to the interrupt controller 33c (S3). In accordance with the instruction, the interrupt controller 33c commands the processor 32 to carry out an interrupt procedure (S4). In response to the command for the interrupt procedure, the processor 32 resets the operation of the processor 32 (S5) (operation malfunction controlling step).

Meanwhile, the error control module 33b controls the interrupt controller 33c so as to prevent the operation of the slave controller 31 from being reset. This can be achieved by, for example, masking part of the interrupt instruction which is transmitted from the error control module 33b to the interrupt controller 33c. Specifically, a register, which sets the procedure (output signal) to be carried out when the error control module 33b receives the malfunction occurrence signal, is changed so that the operation of the slave controller 31 will not be reset.

This configuration makes it possible that in a case where a watchdog timeout occurs, the operation of the processor 32 is reset, whereas the operation of the slave controller 31 is continued.

(Procedure 2 in Case of Operation Malfunction)

In S3, the error control module 33b transmits an error output signal 60 together with the command for the interrupt procedure. The error output signal 60 is transmitted to the control target device 50, to the notifying section 35, and to the communication interface 37.

The transmission of the error output signal 60 can be set, for example, as follows: There is a register for setting whether or not an output of the error output signal 60 is to be masked. The error control module 33b outputs the error output signal 60 in accordance with a value of the register. In a case where an unmasked error output signal 60 occurs, the output of a signal terminal becomes active (Low). The setting for transmission of the error output signal 60 can be changed by changing the setting of the register.

Operation of Control Target Device 50

Conventionally, in a case where a malfunction occurs to an operation of a slave device serving as a high-level control device, a control signal from the slave device is lost, so that a servomotor stops free running. In this case, it may take a long period of time until the motor stops. This may unfortunately cause a problem of the operation of the entire control system.

According to the slave device 3a of the present embodiment, in contrast, the error output signal 60 is transmitted to the control target device 50. By receiving the error output signal 60, the motor control section 52 and the encoder control section 54a recognize that a malfunction has occurred in the operation of the main control section 30. This allows, upon receipt of the error output signal 60, the motor control section 52 and the encoder control section 54a to carry out control so as to slow down and stop the motor 53. It is therefore possible to stop the operation of the motor 53 more quickly. As a result, it is possible to increase stability of the operation of the control system 1.

Operation of Notifying Section 35

The notifying section 35 includes, for example, a plurality of LEDs for providing various information. In a case where the notifying section 35 has received the error output signal 60, the notifying section 35 then (i) turns on an error LED for indicating such malfunction information that a malfunction has occurred in the operation of the main control section 30 and (ii) turns off the other LEDs. This makes it easy to provide a user with the malfunction information.

In a case where the notifying section 35 is, for example, a speaker, the notifying section 35 can provide the user with the malfunction information by a sound or a voice.

The notifying section 35 is configured so that in a case where the error output signal 60 is received, the notifying section 35, as a circuit, blocks any outputs thereof other than an error notification it makes as, for example, an error LED.

Operation of Communication Interface 37

In a case where the communication interface 37 has received the error output signal 60, the communication interface 37 blocks the transmitting section 37b from making an output. On the other hand, the communication interface 37 does not block the receiving section 37a from receiving data.

With this configuration, it is possible to prevent abnormal data from being outputted as a result of the main control section 30 going out of control. By use of the receiving section 37a, it is possible to receive an external communication from outside the slave device 3a.

The communication interface 37 is configured to block an output as a circuit in a case where the communication interface 37 has received the error output signal 60.

(Setting of Register)

The storage section 34 stores registers for setting what control is to be carried out in response to respective error factors. The registers include, for example, an error output setting register, an inner-reset setting register, and an interrupt setting register. The interrupt setting register sets the control of non-maskable interruption to be carried out by the error control module 33b. The error control module 33b collectively manages, for example, 94 error factors, and operates in accordance with the settings of the interrupt setting register.

Conventionally, the initial values of the registers stored in the storage section 34 are set so that in a case where a watchdog timeout occurs, the error control module 33b resets the main control section 30 itself as a microcontroller.

According to the present embodiment, in contrast, the initial settings of the registers are cancelled so as to change the register values stored in the storage section 34. This allows the main control section 30 of the present embodiment to carry out the above-described procedures 1 and 2 in a case where an operation malfunction occurs.

(Procedure 3 in Case of Operation Malfunction)

In a case where a watchdog timeout occurs, the error control module 33b transmits, to the slave controller 31, a malfunction notification signal 61 indicating that a malfunction has occurred in the operation of the slave device 3a. The malfunction notification signal 61 is then transmitted to the master device 2 via the slave controller 31 and the field network 40. This transmission can be carried out by utilizing, for example, ALStatusCode of the Ethernet frame.

With this configuration, the master device 2 can promptly recognize, via the field network 40, that the malfunction has occurred in the operation of the slave device 3a. Based on such information, the master device 2 can flexibly determine what control to carry out in response.

[Effects]

Effects below can be obtained with the present embodiment, the premise of which is the configuration in which the slave controller 31, the processor 32, and the watchdog circuit 33 are included in a one-chip microcontroller. Specifically, in a case where a watchdog timeout has occurred, the error control module 33b transmits a command to the interrupt controller 33c so as to (i) reset the processor 32 and (ii) not reset the slave controller 31. This prevents the operation of the slave controller 31 from being stopped, and therefore allows the communication of the field network 40 to be continued. In particular, in a case where, for example, the field network 40 is EtherCAT, it is possible to prevent the operation of the entire field network 40 from being stopped.

In addition, the error control module 33b transmits an error output signal 60 in a case where a watchdog timeout has occurred. By receiving the error output signal 60, the parts of the slave device 3a and the control target device 50 can carry out suitable procedures. For example, the control target device 50 can flexibly select an operation. While the slave device 3a blocks an output, the slave device 3a can still receive an external communication. In addition, the slave device 3a can provide, to the outside thereof, information indicating that an operation malfunction has occurred. Then, in the case where the watchdog timeout has occurred, the slave device 3a does not block the receiving section 37a from receiving data.

The error control module 33b can transmit a malfunction notification signal 61 to the slave controller 31 so as to notify the master device 2 that a malfunction has occurred.

§ 5. VARIATIONS

An embodiment of the present disclosure described in detail above is merely an example of the present disclosure in many points. It is of course possible to make various modifications and variations, provided that the scope of the present disclosure is not exceeded. For example, variations described below can be made. In the following description, components similar to those in the embodiment will be given the same reference signs, and the descriptions of features similar to those in the embodiment will be omitted as appropriate. The variations below can be combined as appropriate.

<5.1>

According to the embodiment above, the field network 40 is, for example, EtherCAT. However, the type of the field network 40 is not limited to such an example. For example, the field network 40 can be any of the various industrial Ethernets. Alternatively, the field network 40 can be any of field networks, such as DeviceNet, other than an Ethernet.

<5.2>

According to the control system 1 of the embodiment above, the three slave devices 3a through 3c are connected to the master device 2 via a network topology of the daisy-chain type. However, the topology of the control system 1 is not limited to such an example, but can be selected as appropriate according to an embodiment. For example, the topology can be any of various ones, such as a ring type, a star type, and a tree type. In addition, the number of slave devices included in the control system is not limited.

[Software Implementation Example]

Control blocks of the main control section 30 (particularly, the slave controller 31 and the processor 32) can be realized by a logic circuit (hardware) provided in an integrated circuit (IC chip) or the like or can be alternatively realized by software.

In the latter case, the main control section 30 includes a computer that executes instructions of a program that is software realizing the foregoing functions. The computer, for example, includes at least one processor and a computer-readable storage medium storing the program. An object of the present disclosure can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. The program can be made available to the computer via any transmission medium (such as a communication network or a broadcast wave) which allows the program to be transmitted. Note that an aspect of the present disclosure can also be achieved in the form of a computer data signal in which the program is embodied via electronic transmission and which is embedded in a carrier wave.

(Recap)

A control device in accordance with an aspect of the present invention is thus a control device provided in a slave device so as to control an operation of the slave device, which slave device is configured to be connected to a master device via a field network, the control device including: a slave communication controller configured to control communication carried out via the field network; a processing section configured to carry out arithmetic processing; and an operation monitoring section configured to monitor an operation of the control device, the slave communication controller, the processing section, and the operation monitoring section being configured as a one-chip integrated circuit, and the control device being configured so that in a case where the operation monitoring section has detected that a malfunction has occurred in the operation of the control device, the operation monitoring section resets the processing section while not stopping an operation of the slave communication controller.

The control device includes the slave communication controller, the processing section, and the operation monitoring section which are configured as a one-chip integrated circuit. The operation monitoring section monitors whether or not the control device is operating normally. In a case where the operation monitoring section detects that a malfunction has occurred in the operation, the operation monitoring section initializes the control device. In general, in a case where a control device is initialized by an operation monitoring section included in a one-chip integrated circuit, not only a processing section but also a slave communication controller is initialized. In such a case, controlling of communication carried out by the slave communication controller is stopped, so that a field network is unfortunately blocked. For example, in a case where the field network is EtherCAT (registered trademark), the operation of the entire field network may be stopped.

According to the above configuration, in contrast, the operation monitoring section resets the processing section, whereas the operation monitoring section does not stop the operation of the slave communication controller. This allows the operation of the slave communication controller to be continued in a case where the control device is initialized as a result of the occurrence of a malfunction in the operation of the control device. Consequently, the field network is not blocked. This allows communication between the master device and the slave device to be continued. It is therefore possible to increase stability of a control system in which a master device controls a slave device. In particular, in a case of a control system configured so that a plurality of slave devices are connected to a master device in the form of a daisy chain, the control system can continue communication between (i) the slave device whose operation has encountered a malfunction and (ii) the other slave devices. The master device can confirm the respective statuses of the slave devices.

The control device in accordance with the aspect can be configured so as to further include: an output section configured to supply a control signal to a control target device whose operation is controlled in accordance with a command transmitted from the control device, the operation monitoring section including a watchdog timer, a during-malfunction operation control section configured to control a during-malfunction operation in a case where the malfunction has occurred in the operation of the control device, and an interrupt controller, the control device being configured so that in a case where the during-malfunction operation control section has received from the watchdog timer a malfunction occurrence signal indicating that a watchdog timeout has occurred, the during-malfunction operation control section carries out control to (i) cause the interrupt controller to transmit an interrupt signal so as to reset the processing section and (ii) block the output section from supplying the control signal to the control target device.

According to the configuration, the operation monitoring section can typically be a watchdog circuit. In a case where a watchdog timeout has occurred, the during-malfunction operation control section transmits an interruption command to the interrupt controller. In accordance with the command, the interrupt controller resets the processing section. Meanwhile, in the case where the watchdog timeout has occurred, the during-malfunction operation control section blocks output from the output section. This blocks a control signal from being transmitted to the control target device. It is therefore possible to prevent an abnormal control signal from being transmitted from the control device, which has gone out of control, to the control target device. The control target device can also stop operating. It is therefore possible to achieve a higher degree of safety in controlling of a control target device by a slave device.

The control device in accordance with the aspect can be configured so that: in a case where the during-malfunction operation control section has received the malfunction occurrence signal, the during-malfunction operation control section transmits an error output signal; and the error output signal is a signal to be received by the control target device so as to cause the control target device to carry out control to stop an operation in the control target device.

With the configuration, a control section (e.g., microcontroller) included in the control target device can be notified of a malfunction by use of an error output signal. The control section can therefore select how to control the operation of the control target device. For example, in a case where the control target device is a servomotor, the control section of the control target device can carry out control so as to slow down and stop the motor instead of control so as to stop free running of the motor. This makes it possible to more quickly stop the motor. It is therefore possible to achieve an even higher degree of safety in controlling of a control target device by a slave device.

The control device in accordance with the aspect can be configured so as to further include: a notifying section configured to provide a notification of a state of the control device, the control device being configured so that in a case where the notifying section has received the error output signal, the notifying section provides, to an outside of the slave device, malfunction information indicating the malfunction has occurred in the control device.

According to the configuration, the notifying section provides malfunction information in a case where a malfunction has occurred in the control device. Therefore, based on the malfunction information, a user can recognize that the malfunction has occurred in the control device. For example, the user can easily recognize which one of a plurality of slave devices connected to the field network has encountered a malfunction. This allows the user to easily handle the situation thus recognized.

The control device in accordance with the aspect can be configured so that: the field network is EtherCAT; and in a case where the during-malfunction operation control section has received the malfunction occurrence signal, the during-malfunction operation control section transmits information to the master device by use of a data frame of the EtherCAT, the information indicating that the malfunction has occurred in the control device.

With the configuration, information indicating that a malfunction has occurred in the control device can be transmitted to the master device by utilizing a data frame in EtherCAT. This allows the master device to promptly recognize the information so as to select how to handle the operation malfunction of the slave device.

A control method in accordance with an aspect of the present invention is a method of controlling an operation of a slave device which is configured to be connected to a master device via a field network, the slave device including: a main control section including a slave communication controller configured to control communication carried out via the field network; a processing section configured to carry out arithmetic processing; and an operation monitoring section configured to monitor an operation of the control device, the slave communication controller, the processing section, and the operation monitoring section being configured as a one-chip integrated circuit, the method including the step of: carrying out, in a case where the operation monitoring section has detected that a malfunction has occurred in the operation of the control device, operation malfunction control so as to reset the processing section while not stopping an operation of the slave communication controller.

With the configuration, the following can be achieved as in the case of the control device described earlier: In a case where a malfunction has occurred in the operation of the main control section of the slave device, communication carried out via the field network is continued.

The present disclosure is not limited to the embodiment, but can be altered by a skilled person in the art within the scope of the claims. The present disclosure also encompasses, in its technical scope, any embodiment derived by combining technical means disclosed in the above description.

REFERENCE SIGNS LIST

2 Master device
3a through 3c Slave device
30 Main control section (control device)
31 Slave controller (slave communication controller)
32 Processor (processing section)
33 Watchdog circuit (operation monitoring section)
33a Watchdog timer
33b Error control module (during-malfunction operation control section)
33c Interrupt controller
35 Notifying section
36 Reset circuit (external reset circuit)
37b Transmitting section (output section)
40 Field network
50 Control target device
60 Error output signal

The invention claimed is:
1. A control device provided in a slave device so as to control an operation of the slave device, which slave device is configured to be connected to a master device via an EtherCAT,
said control device comprising:
a slave communication controller configured to control communication carried out via the EtherCAT;
a processing section configured to carry out arithmetic processing;
an operation monitoring section configured to monitor an operation of the control device; and
an output section configured to supply a control signal to a control target device whose operation is controlled in accordance with a command transmitted from the control device,
the slave communication controller, the processing section, and the operation monitoring section being configured as a one-chip integrated circuit,
the operation monitoring section including
a watchdog timer,
a during-malfunction operation control section configured to control a during-malfunction operation in a case where the malfunction has occurred in the operation of the control device, and
an interrupt controller,
the control device being configured so that in a case where the watchdog timer has detected that the malfunction has occurred in the operation of the control device, the watchdog timer transmits, to the during-malfunction operation control section, a malfunction occurrence signal indicating that a watchdog timeout has occurred, and the control device being configured so that in a case where the during-malfunction operation control section has received the malfunction occurrence signal, (i) the during-malfunction operation control section causes the interrupt controller to carry out an interrupt procedure so as to reset the processing section and (ii) the during-malfunction operation control section carries out control to (a) cause the interrupt controller not to stop an operation of the slave communication controller and (b) block the output section from supplying the control signal to the control target device.

2. The control device according to claim 1, wherein:

in a case where the during-malfunction operation control section has received the malfunction occurrence signal, the during-malfunction operation control section transmits an error output signal; and the error output signal is a signal to be received by the control target device so as to cause the control target device to carry out control to stop an operation in the control target device.

3. The control device according to claim 2, further comprising:

a notifying section configured to provide a notification of a state of the control device, the control device being configured so that in a case where the notifying section has received the error output signal, the notifying section provides, to an outside of the slave device, malfunction information indicating the malfunction has occurred in the control device.

4. The control device according to claim 1, wherein in a case where the during-malfunction operation control section has received the malfunction occurrence signal, the during-malfunction operation control section transmits information to the master device by use of a data frame of the EtherCAT, the information indicating that the malfunction has occurred in the control device.

5. A method of controlling an operation of a slave device which is configured to be connected to a master device via an EtherCAT, said slave device comprising:
a main control section including
a slave communication controller configured to control communication carried out via EtherCAT,
a processing section configured to carry out arithmetic processing, and
an operation monitoring section configured to monitor an operation of the main control section,
the slave communication controller, the processing section, and the operation monitoring section being configured as a one-chip integrated circuit,
the slave device including an output section configured to supply a control signal to a control target device whose operation is controlled in accordance with a command transmitted from the main control section,
the operation monitoring section including
a watchdog timer,
a during-malfunction operation control section configured to control a during-malfunction operation in a case where the malfunction has occurred in the operation of the main control section, and
an interrupt controller,
said method comprising the steps of:
transmitting, to the during-malfunction operation control section, a malfunction occurrence signal indicative of an occurrence of a watchdog timeout, in a case where the watchdog timer has detected that the malfunction has occurred in the operation of the main control section; and
causing, in a case where the during-malfunction operation control section has received the malfunction occurrence signal, the during-malfunction operation control section to (i) cause the interrupt controller to carry out an interrupt procedure so as to reset the processing section and (ii) carry out control to (a) cause the interrupt controller not to stop an operation of the slave communication controller and (b) block the output section from supplying the control signal to the control target device.

* * * * *